(12) United States Patent
Sakai et al.

(10) Patent No.: US 10,854,185 B2
(45) Date of Patent: Dec. 1, 2020

(54) LAMINATE

(71) Applicant: Toray Industries, Inc., Tokyo (JP)

(72) Inventors: Kenichi Sakai, Otsu (JP); Hiroshi Kajiyama, Otsu (JP)

(73) Assignee: TORAY INDUSTRIES, INC., Tokyo (JP)

( * ) Notice: Subject to any disclaimer, the term of this patent is extended or adjusted under 35 U.S.C. 154(b) by 75 days.

(21) Appl. No.: 16/084,404

(22) PCT Filed: Mar. 29, 2017

(86) PCT No.: PCT/JP2017/012882
§ 371 (c)(1),
(2) Date: Sep. 12, 2018

(87) PCT Pub. No.: WO2017/170686
PCT Pub. Date: Oct. 5, 2017

(65) Prior Publication Data
US 2019/0080678 A1    Mar. 14, 2019

(30) Foreign Application Priority Data

Mar. 31, 2016 (JP) ................. 2016-070884

(51) Int. Cl.
| | |
|---|---|
| *G10K 11/168* | (2006.01) |
| *B32B 5/26* | (2006.01) |
| *B32B 5/02* | (2006.01) |
| *B32B 7/12* | (2006.01) |
| *B32B 27/12* | (2006.01) |
| *B32B 27/36* | (2006.01) |
| *G10K 11/16* | (2006.01) |

(52) U.S. Cl.
CPC ............ *G10K 11/168* (2013.01); *B32B 5/022* (2013.01); *B32B 5/024* (2013.01); *B32B 5/26* (2013.01); *B32B 7/12* (2013.01); *B32B 27/12* (2013.01); *B32B 27/36* (2013.01); *B32B 2262/0284* (2013.01); *B32B 2307/102* (2013.01); *B32B 2307/546* (2013.01); *B32B 2307/718* (2013.01); *G10K 11/16* (2013.01)

(58) Field of Classification Search
CPC ........... B32B 5/022; B32B 5/024; B32B 5/26; G10K 11/168
USPC .......................... 181/175, 284, 294; 442/268
See application file for complete search history.

(56) References Cited

U.S. PATENT DOCUMENTS

2015/0210240 A1    7/2015  Tanaka et al.

FOREIGN PATENT DOCUMENTS

| | | |
|---|---|---|
| JP | 0976387 A | 3/1997 |
| JP | 2002127836 A | 5/2002 |
| JP | 2005215117 A | 8/2005 |
| JP | 2006011276 A | 1/2006 |
| JP | 2009092369 A | 4/2009 |
| JP | 2010064361 A | 3/2010 |
| JP | 2013163869 A | 8/2013 |
| JP | 2014047449 A | 3/2014 |
| WO | 2014034604 A1 | 3/2014 |

OTHER PUBLICATIONS

International Search Report and Written Opinion for International Application No. PCT/JP2017/012882, dated Jul. 4, 2017—5 pages.

*Primary Examiner* — Matthew D Matzek
(74) *Attorney, Agent, or Firm* — RatnerPrestia

(57) ABSTRACT

A laminate having excellent sound absorbing performance in both of a low frequency range and a high frequency range, and is excellent in flexibility, includes a woven fabric layer and a nonwoven fabric layer. The woven fabric layer contains a fiber having a total fineness of 150 to 500 dtex in an amount of 40% by mass or more based on the woven fabric layer in total, a value obtained by dividing a difference between a weave density in a warp direction of the woven fabric layer and a weave density in a weft direction of the woven fabric layer by a smaller one of the weave density in the warp direction of the woven fabric layer and the weave density in the weft direction of the woven fabric layer is 0.5 to 3.5. The woven fabric layer has a basis weight of 100 to 400 $g/m^2$, a thickness of 0.3 to 2.0 mm, and an air permeability of 15 to 40 $cm^3/cm^2/s$. The nonwoven fabric layer has a basis weight of 200 to 500 $g/m^2$ and a thickness of 5 to 40 mm.

5 Claims, No Drawings

LAMINATE

This is the U.S. National Phase application of PCT/JP2017/012882, filed Mar. 29, 2017, which claims priority to Japanese Patent Application No. 2016-070884, filed Mar. 31, 2016, the disclosure of these applications being incorporated herein by reference in their entireties for all purposes.

FIELD OF THE INVENTION

The present invention relates to a laminate including a woven fabric layer and a nonwoven fabric layer.

BACKGROUND OF THE INVENTION

In recent years, quietness has been more emphasized than ever as one of commercial values of products in automobiles and electric products. In general, it is thought to be effective to increase the weight and thickness of a sound absorbing material that serves as a countermeasure component in noise control. However, from the viewpoint of keeping a wide space inside automobiles and living rooms as well as reducing fuel consumption in automobiles, weight reduction and compactification of sound absorbing materials have been required.

Patent Document 1 discloses a thin and light sound absorbing material that is obtained by bonding a nonwoven fabric or a woven or knitted fabric to a porous layer.

Patent Document 2 discloses a sound absorbing material including a face material that is made of a laminated nonwoven fabric of a polyester fiber and a base material that is mainly made of shoddy felt.

PATENT DOCUMENTS

Patent Document 1: Japanese Patent Laid-open Publication No. 9-76387
Patent Document 2: Japanese Patent Laid-open Publication No. 2013-163869

SUMMARY OF THE INVENTION

As for the sound absorbing material disclosed in Patent Document 1, the sound absorbing rate at 1000 Hz in a low frequency region is described as 93% or more, but the sound absorbing rate at 5000 Hz in a high frequency range is not high.

Alternatively, Patent Document 2 discloses a sound absorbing material having a sound absorbing rate at 5000 Hz in a high frequency region of 74% or more, but the sound absorbing material does not have a high sound absorbing rate at 1000 Hz in a low frequency region.

In view of the above-mentioned problems, the present invention aims to provide a laminate that has excellent sound absorbing performance in both of a low frequency range and a high frequency range, is excellent in flexibility, and can be suitably used particularly as a sound absorbing material.

In order to solve the above-mentioned problems, the present invention provides the following laminate.

That is, (1) a laminate including a woven fabric layer and a nonwoven fabric layer, wherein the woven fabric layer contains a fiber having a total fineness of 150 to 500 dtex in an amount of 40% by mass or more based on the woven fabric in total, a value obtained by dividing a difference between a weave density in a warp direction of the woven fabric layer and a weave density in a weft direction of the woven fabric layer by a smaller one of the weave density in the warp direction of the woven fabric layer and the weave density in the weft direction of the woven fabric layer is 0.5 to 3.5, the woven fabric layer has a basis weight of 100 to 400 g/m$^2$, a thickness of 0.3 to 2.0 mm, and an air permeability of 15 to 40 cm$^3$/cm$^2$/s, and the nonwoven fabric layer has a basis weight of 200 to 500 g/m$^2$ and a thickness of 5 to 40 mm.

(2) The laminate according to (1), wherein the woven fabric layer includes two or more different weave repeats in a surface of the woven fabric layer opposite to a surface of the woven fabric layer on a nonwoven fabric layer side.

(3) The laminate according to (1) or (2), having, as for fine pores present on a surface of the woven fabric layer, a pore size dispersity of 10 to 30 in a fine pore size distribution range of 0 to 10 μm, and a pore size dispersity of 20 to 50 in a fine pore size distribution range of 10 to 20 μm.

(4) The laminate according to any one of (1) to (3), having a bending resistance of 300 mm or less.

(5) The laminate according to any one of (1) to (4), wherein the nonwoven fabric layer contains a thermoplastic binder fiber, and has a content of the thermoplastic binder fiber of 10 to 30% by mass based on the nonwoven fabric in total.

The present invention provides a laminate that has excellent sound absorbing performance in both of a low frequency range and a high frequency range, is also excellent in flexibility, and can be suitably used as a sound absorbing material.

DETAILED DESCRIPTION OF EMBODIMENTS OF THE INVENTION

Hereinafter, embodiments of the present invention will be described in detail.

The laminate of the present invention is a laminate including a woven fabric layer and a nonwoven fabric layer, wherein the woven fabric contains a fiber having a total fineness of 150 to 500 dtex in an amount of 40% by mass or more based on the woven fabric in total, a value obtained by dividing a difference between a weave density in a warp direction of the woven fabric and a weave density in a weft direction of the woven fabric by a smaller one of the weave density in the warp direction of the woven fabric and the weave density in the weft direction of the woven fabric is 0.5 to 3.5, the woven fabric layer has a basis weight of 100 to 400 g/m$^2$, a thickness of 0.3 to 2.0 mm, and an air permeability of 15 to 40 cm$^3$/cm$^2$/s, and the nonwoven fabric layer has a basis weight of 200 to 500 g/m$^2$ and a thickness of 5 to 40 mm.

That is, the laminate of the present invention includes the woven fabric layer and the nonwoven fabric layer, has a low-frequency sound absorbing rate at 1000 Hz of 60% or more and a high-frequency sound absorbing rate at 5000 Hz of 70% or more, exhibits excellent sound absorbing properties in both a low frequency region and a high frequency region, and also has excellent flexibility. Due to these properties, the laminate of the present invention can be suitably used particularly as a sound absorbing material. In use of the laminate of the present invention as a sound absorbing material, when the sound absorbing material is placed on an object of placement in such a manner that the nonwoven fabric layer is located on the side of the object of placement of the sound absorbing material relative to the woven fabric layer, and the woven fabric layer is located on the side of a sound source relative to the nonwoven fabric layer, outstanding sound absorbing performance can be obtained.

First, the woven fabric layer of the laminate of the present invention will be described.

As the material of the fiber that constitutes the woven fabric, any fiber materials can be used, such as synthetic fibers including polyester fibers and polyamide fibers, natural fibers such as cotton, and rayon. A thermoplastic resin excellent in heat resistance is preferable. From the viewpoint of contributing to improvement in durability such as light-fastness and flame retardancy, a polyester fiber is more preferable. In consideration of availability, productivity, and dimensional stability, a polyethylene terephthalate fiber is more preferable.

In order to improve the flame retardancy of the laminate, a flame-retardant polyester fiber that is a flame-retardant material may be used as a fiber contained in the woven fabric layer.

Herein, the woven fabric layer needs to contain a fiber having a total fineness of 150 to 500 dtex in an amount of 40% by mass or more based on the woven fabric in total. When the woven fabric layer contains a fiber having a total fineness of 150 to 500 dtex in an amount of 40% by mass or more based on the woven fabric layer in total, it is possible to adjust the air permeability, the basis weight, and the thickness. Accordingly, sound absorption at low frequencies due to the panel vibration and resonance caused by the woven fabric layer and the nonwoven fabric layer as well as sound absorption at high frequencies caused by the nonwoven fabric layer efficiently occur, and it is possible to increase the sound absorbing rate both at low frequencies and high frequencies. More preferably, the woven fabric layer contains a fiber having a total fineness of 200 to 450 dtex in an amount of 40% by mass or more based on the woven fabric in total. Still more preferably, the woven fabric layer contains a fiber having a total fineness of 200 to 450 dtex in an amount of 50% by mass or more based on the woven fabric layer in total. Herein, the total fineness of a fiber refers to the fineness of one fiber (weaving yarn) that constitutes the weave of a woven fabric. For example, when two filament yarns are aligned to form one fiber (weaving yarn), the total fineness is the thickness of the fiber (weaving yarn) consisting of the two filament yarns. When a fiber (weaving yarn) has a fiber form of a multifilament, the lower limit of the monofilament fineness is preferably 1 dtex or more, more preferably 1.5 dtex or more, still more preferably 2 dtex or more. If the monofilament fineness is less than 1 dtex, the yarn has too low rigidity, and panel vibration and resonance due to the sound hardly occur in the woven fabric, and the woven fabric is poor in sound absorbing performance at low frequencies. On the other hand, the upper limit of the monofilament fineness is preferably 7 dtex or less, more preferably 5 dtex or less, still more preferably 4.5 dtex or less. If the monofilament fineness is larger than 7 dtex, the yarn has too high rigidity, and sufficient flexibility of the laminate cannot be obtained.

The form of the fiber that constitutes the woven fabric layer may be any form such as a multifilament, a monofilament, a spun yarn, a false twisted yarn obtained by texturing these yarns, and a fancy twisted yarn, and these yarns can also be combined. Examples of the fancy twisted yarn include a ring yarn, a slab yarn, a loop yarn, and a spiral yarn. More preferably, the fiber has a multifilament form from the viewpoint of flexibility. It should be noted that the multifilament may be a textured false twisted yarn or a fancy twisted yarn.

Moreover, the woven fabric needs to have a value obtained by dividing a difference between a weave density in a warp direction and a weave density in a weft direction of the woven fabric by a smaller one of the weave density in the warp direction of the woven fabric and the weave density in the weft direction of the woven fabric of 0.5 to 3.5. When the value obtained by dividing the difference between the weave density in the warp direction of the woven fabric and the weave density in the weft direction of the woven fabric by a smaller one of the weave density in the warp direction of the woven fabric and the weave density in the weft direction of the woven fabric is 0.5 to 3.5, it is possible to adjust the air permeability of the woven fabric and the fine pore size distribution of fine pores present on a surface of the woven fabric, and to increase the sound absorbing rate both at low frequencies and high frequencies. The value is preferably 0.7 or more and 2.0 or less. Further, the larger one of the weave density in the warp direction of the woven fabric layer and the weave density in the weft direction of the woven fabric layer is preferably 60 to 200 yarns/2.54 cm. When the larger weave density is 60 yarns/2.54 cm or more, it is possible to obtain rigidity of the woven fabric sufficient for further improving sound absorbing performance at low frequencies due to the panel vibration and resonance, whereas when the larger weave density is 200 yarns/2.54 cm or less, it is possible to suppress a decrease in the sound absorbing rate in the high frequency region. From the above-mentioned viewpoint, the lower limit of the larger weave density is preferably 70 yarns/2.54 cm or more, and the upper limit thereof is preferably 150 yarns/2.54 cm or less. Herein, the weave density of the woven fabric layer refers to the finished weave density. Moreover, herein, the weave density in the warp direction of the woven fabric layer refers to the number of weaving yarns threaded per 2.54 cm in the longitudinal direction of the woven fabric that constitutes the woven fabric layer, which is determined according to JIS L 1096 (8.6.1) (1999) as described in the section of EXAMPLES. The weave density in the weft direction of the woven fabric layer refers to the number of weaving yarns arranged per 2.54 cm in the width direction of the woven fabric. Herein, when it is difficult to distinguish between the warp direction and the weft direction of the woven fabric by the above-mentioned method, the warp direction and the weft direction of the woven fabric layer are specified by the following method, and the value obtained by dividing a difference between the weave density in the warp direction and the weave density in the weft direction of the woven fabric layer by a smaller one of the weave density in the warp direction of the woven fabric layer and the weave density in the weft direction of the woven fabric layer is calculated. The woven fabric that constitutes the woven fabric layer is composed of warp yarns and weft yarns, and the direction in which the warp yarns flow and the direction in which the weft yarns flow are orthogonal to each other. That is, in a woven fabric, there are two flowing directions of fibers that constitute the woven fabric, and the two directions are orthogonal to each other. Therefore, a direction parallel to one of these two directions is defined as the warp direction of the woven fabric, and a direction parallel to the other of these two directions is defined as the weft direction of the woven fabric, and weave densities of the woven fabric in these directions are calculated. The difference between the weave densities is divided by the smaller one of the weave densities to give a value as the value obtained by dividing a difference between the weave density in the warp direction and the weave density in the weft direction of the woven fabric by a smaller one of the weave density in the warp direction of the woven fabric and the weave density in the weft direction of the woven fabric.

The woven fabric layer preferably includes two or more different weave repeats in a surface of the woven fabric layer opposite to a surface of the woven fabric layer on a side of the nonwoven fabric layer in the laminate. When the woven fabric layer includes two or more different weave repeats, it becomes possible to facilitate the adjustment of the fine pore size distribution and the balance between sound absorbing performance at low frequencies and sound absorbing performance at high frequencies. Herein, as for the weave repeat, as described in the section of EXAMPLES, test pieces of 10 cm×10 cm each were sampled from five different positions of the woven fabric layer, and when a single weave repeat occupied an area of 10% or more based on the whole test piece surfaces in a surface of the woven fabric layer different from a surface thereof to which the nonwoven fabric layer was to be bonded, it was judged that the woven fabric had one such weave repeat.

As the weave repeat of the woven fabric, any weave repeat of three foundation weaves including plain weave, twill weave, and satin weave, derivative weaves based on three foundation weaves, leno weaves, pile weaves, and figured weaves is applicable. From the viewpoint of the sound absorbing effect, it is preferable to combine these weave repeats. The derivative weaves can be roughly classified into derivative plain weave, derivative twill weave, derivative satin weave, and special weave, and examples of the derivative plain weave include rib weave, warp rib weave, weft rib weave, fancy and figured rib weave, and mat weave. Examples of the derivative twill weave include elongated twill and moved twill. From the viewpoint of the fine pore size distribution, it is preferable that the woven fabric layer include twill weave, satin weave, and/or derivative weave.

As for the type of the woven fabric that constitutes the woven fabric layer, both a single woven fabric and a combination woven fabric can be used.

In addition, the woven fabric layer needs to have a basis weight of 100 to 400 g/m². When the basis weight is 100 g/m² or more, it is possible to impart sufficient rigidity to the woven fabric for further improving the sound absorbing performance at low frequencies due to the panel vibration and resonance effect. Further, when the basis weight is 400 g/m² or less, a light and flexible woven fabric can be obtained, and as a result, when the laminate as a sound absorbing material is bonded to an uneven portion, the laminate is satisfactory in the followability and is excellent in workability. From the above-mentioned viewpoint, the lower limit of the basis weight is preferably 150 g/m² or more, and the upper limit thereof is preferably 300 g/m² or less.

In addition, the woven fabric layer needs to have a thickness of 0.3 to 2.0 mm. When the thickness is 0.3 mm or more, viscous friction occurs between the woven fabrics due to the resonance occurring in the woven fabric layer and the nonwoven fabric layer, and it is possible to increase the sound absorbing rate at low frequencies. When the thickness is 2.0 mm or less, a woven fabric layer excellent in flexibility is obtained. From the above-mentioned viewpoint, the lower limit of the thickness is preferably 0.5 mm or more, and the upper limit thereof is preferably 1.5 mm or less. The thickness is more preferably 1.0 mm or less.

Furthermore, the woven fabric layer needs to have an air permeability of 15 to 40 cm³/cm²/s. Herein, the air permeability is measured according to JIS L 1096-1999 8.27.1, Method A (Frazier method) (1999) as described in the section of EXAMPLES. When the air permeability is 15 cm³/cm²/s or more, in passage of a sound through fiber pores at a constant flow velocity, it is possible to efficiently convert the sound into heat by air friction at the pore portions, and to pass the sound particularly in the high frequency region through the inside of the laminate without reflection. When the air permeability is 40 cm³/cm²/s or less, the sound absorbing rate in the low frequency region can be increased. From the above-mentioned viewpoint, the lower limit of the air permeability is preferably 20 cm³/cm²/s or more, and the upper limit thereof is preferably 35 cm³/cm²/s or less.

As for the fine pore size distribution of fine pores present on a surface of the woven fabric layer, the laminate preferably has a pore size dispersity of 10 to 30 in a fine pore size distribution range of 0 to 10 µm, and a pore size dispersity of 20 to 50 in a fine pore size distribution range of 10 to 20 µm. When the pore size dispersity is within a certain range, it is possible to establish a good balance between sound absorption at low frequencies and sound absorption at high frequencies. More preferably, the laminate has a pore size dispersity of 15 or more and 25 or less in a fine pore size distribution range of 0 to 10 µm, and a pore size dispersity of 25 or more and 40 or less in a fine pore size distribution range of 10 to 20 µm. Still more preferably, the laminate has a pore size dispersity in the range of 15 to 35 in a fine pore size distribution range of 20 to 30 µm. Herein, the fine pores present on the surface of the woven fabric in the present invention refer to those detected as pores by the measurement method described in the item "(9) Pore size dispersity" in EXAMPLES of the present description.

The loom for producing the woven fabric is not particularly limited, and examples of usable looms include shuttleless looms such as a water jet loom and an air jet loom, flying shuttle looms, rapier looms, tappet looms, dobby looms, and jacquard looms. After the weaving, the woven fabric may be subjected to desizing, scouring, relaxing treatment, bleaching treatment, dyeing, or heat setting in a tenter or the like as necessary.

Moreover, the laminate of the present invention may have another sheet-like material or the like in addition to the woven fabric layer as long as the effect of the present invention is not impaired.

Then, the nonwoven fabric layer will be described.

The nonwoven fabric layer has a basis weight of 200 to 500 g/m². Depending on the thickness of the nonwoven fabric, when the basis weight is 200 g/m² or more, the laminate has excellent sound absorbing performance at high frequencies. Further, depending on the thickness of the nonwoven fabric, when the basis weight is 500 g/m² or less, a light and flexible nonwoven fabric can be obtained, and as a result, when the laminate as a sound absorbing material is bonded to an uneven portion, the laminate is satisfactory in the followability and is excellent in workability.

The nonwoven fabric layer has a thickness of 5 to 40 mm. When the thickness is 5 mm or more, an air layer is formed in the gap between fiber filaments, and the air vibrates and the sound turns into to heat, so that the sound absorbing properties are improved not only in the low frequency region but also in the high frequency region. In addition, when the thickness is 40 mm or less, the laminate is excellent in workability when being attached to a narrow space in application to an automobile or the like. In addition, a small thickness improves flexibility. From the above-mentioned viewpoint, the upper limit of the thickness of the nonwoven fabric is more preferably 30 mm or less. The thickness is still more preferably 25 mm or less.

The nonwoven fabric layer preferably contains a thermoplastic fiber from the viewpoint of productivity and uniformity of heat insulating performance. Further, the nonwoven fabric layer preferably further contains a thermoplastic binder fiber.

Examples of the thermoplastic fiber contained in the nonwoven fabric layer include a polyethylene terephthalate fiber, a polyamide fiber, and a polypropylene fiber. Among them, a polyethylene terephthalate fiber is preferable from the viewpoint that the fiber is excellent in hydrophobicity and heat resistance and contributes to improvement in durability and flame retardancy.

In order to improve the flame retardancy of the laminate, a flame-retardant polyester fiber that is a flame-retardant material may be used as a fiber contained in the nonwoven fabric layer.

The nonwoven fabric layer preferably contains a thermoplastic fiber having a single yarn fineness of 1.0 dtex or less in an amount of 5 to 40% by mass based on the nonwoven fabric in total. When the nonwoven fabric layer contains a thermoplastic fiber having a single yarn fineness of 1.0 dtex or less in an amount of 5% by mass or more based on the nonwoven fabric in total, the sound absorbing performance can be further improved. On the other hand, when the nonwoven fabric layer contains a thermoplastic fiber having a single yarn fineness of 1.0 dtex or less in an amount of 40% by mass or less based on the nonwoven fabric in total, since the percentage of the thermoplastic fiber having a small fineness is low, the passability of the thermoplastic fiber through the carding step in the production of the nonwoven fabric is further improved, and the productivity is further improved. The nonwoven fabric layer more preferably contains a thermoplastic fiber having a single yarn fineness of 1.0 dtex or less in an amount of 10% by mass or more, and particularly preferably contains such fiber in an amount of 15% by mass or more based on the nonwoven fabric layer in total. The nonwoven fabric layer more preferably contains a thermoplastic fiber having a single yarn fineness of 1.0 dtex or less in an amount of 30% by mass or less based on the nonwoven fabric in total.

In order to improve the air holding performance of the nonwoven fabric layer to improve the sound absorbing performance of the laminate, the nonwoven fabric layer preferably contains a thermoplastic fiber having a hollow structure in an amount of 5 to 30% by mass based on the nonwoven fabric layer in total. When the nonwoven fabric layer contains a thermoplastic fiber having a hollow structure in an amount of 5% by mass or more based on the nonwoven fabric in total, the air holding performance of the nonwoven fabric layer is further improved, and the sound absorbing performance of the laminate is further improved. On the other hand, when the nonwoven fabric layer contains a thermoplastic fiber having a hollow structure in an amount of 30% by mass or less based on the nonwoven fabric in total, since the percentage of the hollow fiber is low, the laminate is suppressed from being bulky while retaining the excellent heat insulating performance. The nonwoven fabric layer more preferably contains a thermoplastic fiber having a hollow structure in an amount of 10% by mass or more, and particularly preferably contains such fiber in an amount of 15% by mass or more based on the nonwoven fabric in total. The nonwoven fabric layer more preferably contains a thermoplastic fiber having a hollow structure in an amount of 25% by mass or less based on the nonwoven fabric in total.

The structure of the thermoplastic binder fiber contained in the nonwoven fabric layer is preferably a core-sheath structure composed of polyethylene terephthalate for the core and a binder component for the sheath from the viewpoint of suppressing thermal shrinkage of the nonwoven fabric.

The binder component is not particularly limited, but it is preferable to use terephthalic acid or an ester-forming derivative thereof, isophthalic acid or an ester-forming derivative thereof, a lower alkylene glycol, or a copolymerized polyester formed of a polyalkylene glycol and/or a monoether thereof.

The content of the thermoplastic binder fiber is preferably 10 to 30% by mass based on the nonwoven fabric layer in total. When the content of the thermoplastic binder fiber is 10% by mass or more, filaments of the thermoplastic fiber can be sufficiently bonded to each other, and the bending resistance of the nonwoven fabric layer can be maintained at a certain level or above. On the other hand, when the content of the thermoplastic binder fiber is 30% by mass or less, it is possible to suppress stiffening of the nonwoven fabric due to too strong bonding between filaments of the thermoplastic fiber, so that a laminate more excellent in flexibility can be obtained.

The thermoplastic fiber used in the nonwoven fabric layer preferably has crimps. The crimps improve the bulkiness, so that a laminate excellent in sound absorbing performance and shape retainability can be obtained. Further, in the carding method, the thermoplastic fiber is firmly caught by a needle, and uniformly dispersed and densely entangled with other fibers, so that a nonwoven fabric can be obtained at a stable and high yield.

When the nonwoven fabric layer contains a thermoplastic fiber, the average fiber length of the thermoplastic fiber is preferably 10 to 90 mm. Bonding a thermoplastic fiber having an average fiber length of 10 mm or more with a thermoplastic binder fiber is preferable because the nonwoven fabric is more excellent in bending resistance and is also more excellent in shape retainability. On the other hand, when the average fiber length is 90 mm or less, in the step of producing a nonwoven fabric containing the thermoplastic fiber and the thermoplastic binder fiber, that is, in a fiber dispersing step by a carding method or an air-laid method, the thermoplastic fiber and the thermoplastic binder fiber are uniformly dispersed and densely entangled with each other, so that fine voids can be formed and a laminate excellent in sound absorbing performance can be obtained.

As for a method for producing the nonwoven fabric used in the nonwoven fabric layer, it is preferable to obtain the nonwoven fabric by mixing a thermoplastic fiber with a thermoplastic binder fiber as necessary, opening the fibers, subjecting the fibers to a carding method or an air-laid method to give a plurality of webs, laminating the webs, and subjecting the obtained laminate to heat treatment. That is, the nonwoven fabric can be produced by laminating a plurality of webs obtained by the carding method or the air-laid method, in which a thermoplastic fiber and a thermoplastic binder fiber are uniformly dispersed. An example of the heat treatment temperature is a temperature that is higher than a temperature at which the binder component (low-melting point component) in the thermoplastic binder fiber softens or melts and is lower than a temperature at which a component other than the binder component melts. As a result, the low-melting point component softens or melts to firmly bind the thermoplastic fiber, so that a laminate excellent in long-term shape retainability is obtained. Examples of the usable heat treatment technique include a hot air dryer, a hot air circulation type heat treatment machine, an infrared heater, and a heating roll.

As for the method for adjusting the basis weight and thickness of the nonwoven fabric layer, a nonwoven fabric having a desired basis weight and a desired thickness can be obtained by determining the amount of the webs laminated in the nonwoven fabric according to the feed speed in the lamination step of the webs in the nonwoven fabric, and further adjusting the thickness of the nonwoven fabric with a roll before the heat treatment step.

Examples of a method for joining the woven fabric layer with the nonwoven fabric layer include a method of sandwiching a resin in the powder form, which contains a polyolefin or the like having a melting point lower than those of components of fibers that constitute the woven fabric and the nonwoven fabric (an example of the polyolefin is polypropylene), between the woven fabric layer and the nonwoven fabric layer and joining the layers together by pressing with a heating roller, and a method of spraying a powdery adhesive to the nonwoven fabric layer, placing the woven fabric layer thereon, and further joining the layers together with a heating roller.

In the case of bonding the woven fabric layer with the nonwoven fabric layer with a low-melting point resin for joining the two layers together, the amount of the low-melting point resin to be applied or sprayed to the woven fabric layer or the nonwoven fabric layer is preferably 3 to 30 g/m$^2$. If the amount is less than 3 g/m$^2$, sufficient adhesiveness cannot be obtained. On the other hand, if the amount exceeds 30 g/m$^2$, the laminate is deteriorated in air permeability and sound absorbing performance at high frequencies. From the above-mentioned viewpoint, the lower limit of the amount is preferably 5 g/m$^2$ or more, and the upper limit thereof is preferably 20 g/m$^2$ or less.

Then, a laminate obtained by joining the woven fabric layer with the nonwoven fabric layer will be described.

The laminate preferably has particularly excellent flexibility, and preferably has a bending resistance of 300 mm or less as a value showing the particularly excellent flexibility. When the bending resistance is 300 mm or less, the laminate is particularly excellent in flexibility at the time of being bonded along a curved portion, so that generation of gaps and wrinkles between the curved portion and the laminate and deterioration in the sound absorbing performance are suppressed, and the adhesion between the laminate and the curved portion is further improved. From the above-mentioned viewpoint, the bending resistance is more preferably 150 mm or more, and is preferably 250 mm or less. It should be noted that the flexibility of the laminate can be adjusted within the above-mentioned range by appropriately adjusting one or more conditions selected from the group consisting of monofilament fineness of the woven fabric, fiber form of the woven fabric, basis weight of the woven fabric, thickness of the woven fabric, basis weight of the nonwoven fabric, thickness of the nonwoven fabric, content of the thermoplastic binder fiber in the nonwoven fabric, and average fiber length of the nonwoven fabric. Specifically, the bending resistance of the laminate can be set within the above-mentioned range by adopting the structure of the laminate of Example 1, for example.

As for the sound absorbing properties of the laminate, it is preferable that high sound absorbing performance be obtained in the low frequency region to the high frequency region, the low-frequency sound absorbing rate at 1000 Hz be 60% or more, and the high-frequency sound absorbing rate at 5000 Hz be 70% or more.

When the sound absorbing rate at 1000 Hz is 60% or more and the sound absorbing rate at 5000 Hz is 70% or more, the laminate is excellent in sound absorbing properties and is suitable for use in automobiles and the like. The low-frequency sound absorbing rate at 1000 Hz and the high-frequency sound absorbing rate at 5000 Hz of the laminate can be set within the above-mentioned ranges by appropriately adjusting the following properties. Specifically, for example, the low-frequency sound absorbing rate at 1000 Hz and the high-frequency sound absorbing rate at 5000 Hz of the laminate can be set within the above-mentioned ranges by adopting the structure of the laminate of Example 1, for example.

The percentage of the fiber having a total fineness of 150 to 500 dtex in the woven fabric layer based on the woven fabric layer in total; the monofilament fineness of the woven fabric layer; the value obtained by dividing the difference between the weave density in the warp direction of the woven fabric layer and the weave density in the weft direction of the woven fabric by a smaller one of the weave density in the warp direction of the woven fabric and the weave density in the weft direction of the woven fabric layer; the larger one of the weave density in the warp direction of the woven fabric layer and the weave density in the weft direction of the woven fabric layer; the number of weave repeats included in the woven fabric layer; the basis weight of the woven fabric layer; the thickness of the woven fabric layer; the air permeability of the woven fabric layer; the fine pore size distribution of the fine pores present on the surface of the woven fabric layer; the thickness of the nonwoven fabric layer; the percentage of the thermoplastic fiber having a single yarn fineness of 1.0 dtex or less in the nonwoven fabric layer based on the nonwoven fabric layer in total; the percentage of the thermoplastic fiber having a hollow structure in the nonwoven fabric layer based on the nonwoven fabric in total; and the amount of the low-melting point resin that joins the woven fabric layer and the nonwoven fabric layer together.

The laminate of the present invention can be suitably used particularly as a sound absorbing material, and is also suitable for use as a sound absorbing material for electric appliances, residential use and the like other than automobiles.

EXAMPLES

Hereinafter, the present invention will be specifically described with reference to examples, but the present invention is not limited to these examples. The performance in the examples was measured by the following methods.

[Measurement Methods]

(1) Total Fineness of Fiber (Weaving Yarn) of Woven Fabric

According to JIS L 1096 (2010) 8.8.1, test pieces of 20 cm×20 cm each were sampled from three arbitrary positions of a sample, and the warp and weft yarns were raveled to give 25 warp yarns and 25 weft yarns per test piece. Then, the masses (mg) of 25 warp yarns and 25 weft yarns were weighed, and the finenesses of the warp and weft yarns were obtained by the following formula.

$$T=\{(0.2\times W)/(1+P/100)\}\times 10$$

wherein

T is the yarn fineness (dtex),

W is the mass (mg) of 25 yarns in the sample, and

P is the weave shrinkage rate (%) of the yarns.

The weave shrinkage rate of the yarns was obtained according to JIS L 1096 (2010) 8.7.2, Method B.

(2) Single Yarn Fineness of Nonwoven Fabric

According to JIS L 1015 (1999) 8.5.1, Method A, fiber filaments as a sample were aligned in parallel with a gold comb and placed on a flock paper piece placed on a cutting table, and a plate gauge was pressure-bonded to the sample with the sample being tightly stretched with moderate force. The sample was cut into a length of 30 mm with a blade such as a safety razor, a set of 300 fiber filaments was counted and the mass of the fiber filaments was weighed, and the apparent fineness thereof was determined. From the apparent fineness and the equilibrium moisture regain separately measured, the fineness based on corrected mass (dtex) was calculated by the following formula. The average of five measurements was obtained and taken as the single yarn fineness of the nonwoven fabric.

$$F0=D' \times \{(100+R0)/(100+Re)\}$$

F0: fineness based on corrected mass (dtex)
D': apparent fineness (dtex)
R0: official moisture regain (0.4)
Re: equilibrium moisture regain The equilibrium moisture regain Re was obtained by sampling a portion of about 5 g from a sample that had reached water equilibrium, weighing the mass and absolute dry mass of the sample, and performing the calculation according to the following formula.

$$Re=(m-m')/m' \times 100$$

wherein
m is the mass (g) of the sample when sampled; and
m' is the absolute dry mass (g) of the sample.

(3) Weave Density in Warp Direction of Woven Fabric and Weave Density in Weft Direction of Woven Fabric (Yarns/2.54 Cm)

The weave densities were measured according to the method defined in JIS L 1096 (8.6.1) (1999).

A sample was placed on a flat table, any unnatural wrinkles and tension were eliminated, and the numbers of weft yarns and warp yarns in a section of 2.54 cm were counted at five different positions. The averages of the values were calculated, and the weave density in the warp direction of the woven fabric (yarns/2.54 cm) and the weave density in the weft direction of the woven fabric (yarns/2.54 cm) were determined.

(4) Basis Weight of Woven Fabric Layer, Nonwoven Fabric Layer, and Laminate (g/m²)

The mass per unit area (1 m²) of the sample was determined according to the method defined in JIS L 1096 (8.4.2) (2010).

(5) Thickness of Woven Fabric Layer (Mm)

The thickness (mm) of the woven fabric layer was determined using a thickness measuring device manufactured by TECLOCK Corporation according to the method defined in JIS L 1096 (8.5.1) (2010).

(6) Thickness of Nonwoven Fabric Layer (Mm)

The length of the side surface of the nonwoven fabric layer in the longitudinal direction was measured with a mold ruler, and was taken as the thickness (mm).

(7) Number of Types of Weave Repeats

Test pieces of 10 cm×10 cm each were sampled from five different positions of a woven fabric sample, and surfaces of the woven fabric samples different from surfaces thereof to which the nonwoven fabric layer was to be bonded were photographed with a digital camera. Using image analysis software, the percentage of the area occupied by a single weave repeat in the total area of the sample surfaces was determined on the woven fabric surface in the obtained photograph, and the average for the weave repeat was calculated using five test pieces. In the present invention, when the value was 10% or more, it was judged that the woven fabric had the weave repeat.

(8) Air Permeability

The air permeability was measured according to JIS L 1096-1999 8.27.1, Method A (Frazier method). Test pieces of 20 cm×20 cm each were sampled from five different positions of a sample, and using a Frazier testing machine, each of the test pieces was attached to one end (at an air intake side) of a cylinder. In attaching the test piece, the test piece was placed on the cylinder, and a load of about 98 N (10 kgf) was evenly applied to the test piece so as not to block the air intake part to prevent leakage of air at the mounting part of the test piece. After the test piece was attached, a suction fan was adjusted with a rheostat so that an inclined barometer would show a pressure of 125 Pa, and the amount of air passing through the test piece was obtained from the pressure indicated by a vertical barometer and the type of air hole used at that time based on the table attached to the testing machine. The average of the five test pieces was calculated.

(9) Pore Size Dispersity

The pore size dispersity was measured according to the method defined in ASTM F 316-86.

The measurement was performed with "Perm-Porometer" manufactured by Porous Materials, Inc. as a measurement device and "GALWICK" manufactured by PMI as a measurement reagent under the conditions of a cylinder pressure of 100 kPa and a measurement mode of WET UP-DRY UP.

Values of pore size dispersity in the obtained fine pore size distribution (histogram) of 10 nm increments (classes), that is, fine pore size distribution ranges of 0 to 10 nm, 10 to 20 nm, and 20 to 30 nm were determined. As for the fine pore size distribution, in a distribution chart in which the y axis is the fine pore size distribution and the x axis is the fine pore size, the range of the x axis is 0 to 100 nm, and the total dispersity obtained by summing the dispersities in 10 nm increments is 100%.

(10) Sound Absorbing Rate (%)

The sound absorbing rate was measured according to the vertical incidence sound absorption measurement method (tube method) of JIS A 1405 (1998). As the test apparatus, an automatic vertical incidence sound absorbing rate measuring device (model 10041A) manufactured by Japan Electronic Instrument Co, Ltd. was used. The test piece was placed at one end of an impedance tube for measurement so that there was no air layer between the test piece and a metal reflector plate and that the test piece fitted within a spacer having an appropriate thickness. When the sample was composed of a woven fabric layer and a nonwoven fabric layer, the sample was placed so that the woven fabric layer was placed on the sound wave side and the nonwoven fabric layer was placed on the metal reflector plate side. As for the sound absorbing rate for each frequency, a value obtained by multiplying the sound absorption coefficient obtained in the measurement by 100 was adopted. Then, the obtained sound absorbing rate at 1000 Hz was taken as the low-frequency sound absorbing rate, and the obtained sound absorbing rate at 5000 Hz was taken as the high-frequency sound absorbing rate.

(11) Bending Resistance

Bending resistances of the laminate in an arbitrary direction of the laminate and a direction perpendicular to the arbitrary direction were measured (each n=5) by Method A (45° cantilever method) defined in JIS L 1096 (8.19.1) (2010), and the bending resistance (mm) was obtained from the average of 10 samples.

(12) Comprehensive Evaluation

The comprehensive evaluation of the obtained laminate was carried out according to the following criteria.

A: A laminate having a low-frequency sound absorbing rate at 1000 Hz of 60% or more, a high-frequency sound absorbing rate at 5000 Hz of 70% or more, and a bending resistance of 300 mm or less.

B: A laminate having a low-frequency sound absorbing rate at 1000 Hz of 60% or more, a high-frequency sound absorbing rate at 5000 Hz of 70% or more, and a bending resistance more than 300 mm.

C: A laminate satisfying at least one of a low-frequency sound absorbing rate at 1000 Hz less than 60% and a high-frequency sound absorbing rate at 5000 Hz less than 70%.

Example 1

(Woven Fabric Layer)

Using a 167 dtex/2-48 filament polyethylene terephthalate false twisted yarn (total fineness: 350 dtex) as a warp yarn and a 167 dtex/2-48 filament polyethylene terephthalate false twisted yarn (total fineness: 340 dtex) as a weft yarn, a woven fabric dyed in gray having a finished weave density in the warp direction of 49 yarns/2.54 cm and a finished weave density in the weft direction of 90 yarns/2.54 cm, a basis weight of 220 g/m², and a thickness of 0.7 mm was obtained. The ratio between the used yarns was 67% by mass of the 167 dtex/2-48 filament polyethylene terephthalate false twisted yarn (total fineness: 350 dtex) and 33% by mass of the 167 dtex/2-48 filament polyethylene terephthalate false twisted yarn (total fineness: 340 dtex). Note that the woven fabric had two weave repeats of plain weave and warp rib weave, and the percentage of the weaving yarn having a total fineness of 150 to 500 dtex based on the woven fabric in total was 100%. The evaluation results such as air permeability are shown in Table 1.

Further, 10 g/m² of a low-melting point powder resin was sprayed to the back surface of the woven fabric (the surface of the woven fabric on the side to be bonded to the nonwoven fabric layer), and the woven fabric was passed through a heating and melting apparatus at 130° C. to give a woven fabric to which the low-melting point powder resin was bonded.

(Nonwoven Fabric Layer)

As thermoplastic fibers, 15% by mass of a polyethylene terephthalate short fiber ("TETORON" (registered trademark) manufactured by TORAY INDUSTRIES, INC.) having an average fiber length of 35 mm and a single yarn fineness of 0.8 dtex, 15% by mass of a hollow polyethylene terephthalate short fiber ("TETORON" (registered trademark) manufactured by TORAY INDUSTRIES, INC.) having an average fiber length of 51 mm and a single yarn fineness of 6.6 dtex, and 55% by mass of a polyethylene terephthalate short fiber ("TETORON" (registered trademark) manufactured by TORAY INDUSTRIES, INC.) having an average fiber length of 51 mm and a single yarn fineness of 2.2 dtex, and, as a thermoplastic binder fiber, 15% by mass of a core-sheath composite fiber of a polyethylene terephthalate short fiber (sheath component: low-melting point polyethylene terephthalate (melting point: 110° C.), core component: homopolyethylene terephthalate (melting point: 255° C.), sheath rate: 50% by mass, "SAF-MET" (registered trademark) T9611 manufactured by TORAY INDUSTRIES, INC.) having an average fiber length of 51 mm and a single yarn fineness of 2.2 dtex were mixed.

The fibers were mixed and opened using a card machine, and uniform webs were formed. Then, the webs were laminated so as to have a predetermined thickness, and the fibers were thermally fused together in a heat treatment furnace at 215° C. having upper and lower net conveyors while the webs were pressed with a pressing roll so as to have a thickness of 20 mm, and the basis weight and the thickness were adjusted to 400 g/m² and 20 mm, respectively, to give a nonwoven fabric.

(Laminate)

The surface of the previously produced woven fabric layer to which the low-melting point powder had been applied was placed as the woven fabric layer surface on the nonwoven fabric layer came out of the heating furnace, and the low-melting point powder was melted with the two layers being pressed with a heating roller at 130° C. to give a laminate including the woven fabric layer and the nonwoven fabric layer joined together.

The obtained laminate had a bending resistance of 210 mm, a sound absorbing rate at 1000 Hz of 75%, and a sound absorbing rate at 5000 Hz of 90%, and the comprehensive evaluation of the laminate was "A". The structure and properties of the laminate are shown in Table 1.

Example 2

(Woven Fabric Layer)

Using a 167 dtex-48 filament polyethylene terephthalate false twisted yarn (total fineness: 175 dtex) as a warp yarn and a 167 dtex/2-48 filament polyethylene terephthalate false twisted yarn (total fineness: 350 dtex) as a weft yarn, a woven fabric dyed in gray having a finished weave density in the warp direction of 53 yarns/2.54 cm and a finished weave density in the weft direction of 98 yarns/2.54 cm, a basis weight of 160 g/m², and a thickness of 0.5 mm was obtained. The ratio between the used yarns was 49% by mass of the 167 dtex-48 filament polyethylene terephthalate false twisted yarn (total fineness: 175 dtex) and 51% by mass of the 167 dtex/2-48 filament polyethylene terephthalate false twisted yarn (total fineness: 350 dtex). Note that the woven fabric had two weave repeats of 3 harness warp twill weave and 3 harness weft twill weave, and the percentage of the weaving yarn having a total fineness of 150 to 500 dtex based on the woven fabric in total was 100%. The evaluation results such as air permeability are shown in Table 1.

A woven fabric to which the low-melting point powder resin was bonded by the same coating method of the low-melting point powder resin as in Example 1 was obtained.

(Nonwoven Fabric Layer)

The same nonwoven fabric as in Example 1 was used.

(Laminate)

A laminate was obtained by the same joining method as in Example 1. The obtained laminate had a bending resistance of 180 mm, a sound absorbing rate at 1000 Hz of 71%, and a sound absorbing rate at 5000 Hz of 88%, and the comprehensive evaluation of the laminate was "A". The structure and properties of the laminate are shown in Table 1.

Example 3

(Woven Fabric Layer)

Using a 56 dtex-36 filament polyethylene terephthalate false twisted yarn (total fineness: 59 dtex) and a 167 dtex-72 filament polyethylene terephthalate false twisted yarn (total fineness: 174 dtex) as warp yarns and a 167 dtex/2-48 filament polyethylene terephthalate false twisted yarn (total fineness: 350 dtex) as a weft yarn, a woven fabric dyed in gray having a finished weave density in the warp direction of 83 yarns/2.54 cm and a finished weave density in the weft direction of 342 yarns/2.54 cm, a basis weight of 220 g/m$^2$, and a thickness of 0.7 mm was obtained. The ratio among the used yarns was 58% by mass of the 56 dtex-36 filament polyethylene terephthalate false twisted yarn (total fineness: 59 dtex), 28% by mass of the 167 dtex-72 filament polyethylene terephthalate false twisted yarn (total fineness: 174 dtex), and 14% by mass of the 167 dtex/2-48 filament polyethylene terephthalate false twisted yarn (total fineness: 350 dtex). Note that the woven fabric had two weave repeats of 5 harness satin weave and leno weave, and the percentage of the weaving yarn having a total fineness of 150 to 500 dtex based on the woven fabric in total was 42%. The evaluation results such as air permeability are shown in Table 1.

A woven fabric to which the low-melting point powder resin was bonded by the same coating method of the low-melting point powder resin as in Example 1 was obtained.

(Nonwoven Fabric Layer)

The same nonwoven fabric as in Example 1 was used.

(Laminate)

A laminate was obtained by the same joining method as in Example 1.

The obtained laminate had a bending resistance of 190 mm, a sound absorbing rate at 1000 Hz of 81%, and a sound absorbing rate at 5000 Hz of 76%, and the comprehensive evaluation of the laminate was "A". The structure and properties of the laminate are shown in Table 1.

Example 4

(Woven Fabric Layer)

Using a 167 dtex/2-48 filament polyethylene terephthalate false twisted yarn (total fineness: 350 dtex) as a warp yarn and a 330 dtex-96 filament polyethylene terephthalate false twisted yarn (total fineness: 360 dtex) as a weft yarn, a woven fabric dyed in gray having a finished weave density in the warp direction of 59 yarns/2.54 cm and a finished weave density in the weft direction of 89 yarns/2.54 cm, a basis weight of 180 g/m$^2$, and a thickness of 0.5 mm was obtained. The ratio between the used yarns was 59% by mass of the 167 dtex/2-48 filament polyethylene terephthalate false twisted yarn (total fineness: 350 dtex) and 41% by mass of the 330 dtex-96 filament polyethylene terephthalate false twisted yarn (total fineness: 360 dtex). Note that the woven fabric had one weave repeat of elongated twill, and the percentage of the weaving yarn having a total fineness of 150 to 500 dtex based on the woven fabric in total was 100%. The evaluation results such as air permeability are shown in Table 1.

A woven fabric to which the low-melting point powder resin was bonded by the same coating method of the low-melting point powder resin as in Example 1 was obtained.

(Nonwoven Fabric Layer)

The same nonwoven fabric as in Example 1 was used.

(Laminate)

A laminate was obtained by the same joining method as in Example 1.

The obtained laminate had a bending resistance of 200 mm, a sound absorbing rate at 1000 Hz of 64%, and a sound absorbing rate at 5000 Hz of 80%, and the comprehensive evaluation of the laminate was "A". The structure and properties of the laminate are shown in Table 1.

Example 5

Using a 167 dtex-48 filament polyethylene terephthalate false twisted yarn (total fineness: 175 dtex) as a warp yarn and a weft yarn, a woven fabric dyed in gray having a finished weave density in the warp direction of 49 yarns/2.54 cm and a finished weave density in the weft direction of 90 yarns/2.54 cm, a basis weight of 130 g/m$^2$, and a thickness of 0.3 mm was obtained. Note that the woven fabric had two weave repeats of plain weave and warp rib weave, and the percentage of the weaving yarn having a total fineness of 150 to 500 dtex based on the woven fabric in total was 100%. The evaluation results such as air permeability are shown in Table 1.

A woven fabric to which the low-melting point powder resin was bonded by the same coating method of the low-melting point powder resin as in Example 1 was obtained.

(Nonwoven Fabric Layer)

The same nonwoven fabric as in Example 1 was used.

(Laminate)

A laminate was obtained by the same joining method as in Example 1. The obtained laminate had a bending resistance of 190 mm, a sound absorbing rate at 1000 Hz of 63%, and a sound absorbing rate at 5000 Hz of 78%, and the comprehensive evaluation of the laminate was "A". The structure and properties of the laminate are shown in Table 1.

Example 6

(Woven Fabric Layer)

The same woven fabric as in Example 1 was used.

(Nonwoven Fabric Layer)

As thermoplastic fibers, 15% by mass of a polyethylene terephthalate short fiber ("TETORON" (registered trademark) manufactured by TORAY INDUSTRIES, INC.) having an average fiber length of 35 mm and a single yarn fineness of 0.8 dtex, 15% by mass of a hollow polyethylene terephthalate short fiber ("TETORON" (registered trademark) manufactured by TORAY INDUSTRIES, INC.) having an average fiber length of 51 mm and a single yarn fineness of 6.6 dtex, and 55% by mass of a polyethylene terephthalate short fiber ("TETORON" (registered trademark) manufactured by TORAY INDUSTRIES, INC.) having an average fiber length of 51 mm and a single yarn fineness of 2.2 dtex, and, as a thermoplastic binder fiber, 35% by mass of a core-sheath composite fiber of a polyethylene terephthalate short fiber (sheath component: low-melting point polyethylene terephthalate (melting point: 110° C.), core component: homopolyethylene terephthalate (melting point: 255° C.), sheath rate: 30% by mass, "SAFMET" (registered trademark) T9611 manufactured by TORAY INDUSTRIES, INC.) having an average fiber length of 51 mm and a single yarn fineness of 2.2 dtex were mixed.

The fibers were mixed and opened using a card machine, and uniform webs were formed. Then, the webs were laminated so as to have a predetermined thickness, and the fibers were thermally fused together in a heat treatment furnace at 215° C. having upper and lower net conveyors while the webs were pressed with a pressing roll so as to have a thickness of 20 mm, and the basis weight and the thickness were adjusted to 400 g/m² and 20 mm, respectively, to give a nonwoven fabric.

(Laminate)

A laminate was obtained by the same joining method as in Example 1. The obtained laminate had a bending resistance of 340 mm, a sound absorbing rate at 1000 Hz of 72%, and a sound absorbing rate at 5000 Hz of 87%, and the comprehensive evaluation of the laminate was "B". The structure and properties of the laminate are shown in Table 1.

Example 7

(Woven Fabric Layer)

The same woven fabric as in Example 1 was used.

(Nonwoven Fabric Layer)

A nonwoven fabric was obtained in the same manner as in Example 1 and used as a nonwoven fabric layer except that, as thermoplastic fibers, 15% by mass of a polyethylene terephthalate short fiber ("TETORON" (registered trademark) manufactured by TORAY INDUSTRIES, INC.) having an average fiber length of 51 mm and a single yarn fineness of 1.7 dtex, 15% by mass of a hollow polyethylene terephthalate short fiber ("TETORON" (registered trademark) manufactured by TORAY INDUSTRIES, INC.) having an average fiber length of 51 mm and a single yarn fineness of 6.6 dtex, and 55% by mass of a polyethylene terephthalate short fiber ("TETORON" (registered trademark) manufactured by TORAY INDUSTRIES, INC.) having an average fiber length of 51 mm and a single yarn fineness of 2.2 dtex, and, as a thermoplastic binder fiber, 15% by mass of a core-sheath composite fiber of a polyethylene terephthalate short fiber (sheath component: low-melting point polyethylene terephthalate (melting point: 110° C.), core component: homopolyethylene terephthalate (melting point: 255° C.), sheath rate: 50% by mass, "SAF-MET" (registered trademark) T9611 manufactured by TORAY INDUSTRIES, INC.) having an average fiber length of 51 mm and a single yarn fineness of 2.2 dtex were mixed.

(Laminate)

A laminate was obtained by the same joining method as in Example 1. The obtained laminate had a bending resistance of 280 mm, a sound absorbing rate at 1000 Hz of 70%, and a sound absorbing rate at 5000 Hz of 75%, and the comprehensive evaluation of the laminate was "A". The structure and properties of the laminate are shown in Table 1.

Example 8

(Woven Fabric Layer)

The same woven fabric as in Example 1 was used.

(Nonwoven Fabric Layer)

A nonwoven fabric was obtained in the same manner as in Example 1 and used as a nonwoven fabric layer except that, as thermoplastic fibers, 15% by mass of a polyethylene terephthalate short fiber ("TETORON" (registered trademark) manufactured by TORAY INDUSTRIES, INC.) having an average fiber length of 35 mm and a single yarn fineness of 0.8 dtex, 15% by mass of a polyethylene terephthalate short fiber ("TETORON" (registered trademark) manufactured by TORAY INDUSTRIES, INC.) having an average fiber length of 51 mm and a single yarn fineness of 6.6 dtex, and 55% by mass of a polyethylene terephthalate short fiber ("TETORON" (registered trademark) manufactured by TORAY INDUSTRIES, INC.) having an average fiber length of 51 mm and a single yarn fineness of 2.2 dtex, and, as a thermoplastic binder fiber, 15% by mass of a core-sheath composite fiber of a polyethylene terephthalate short fiber (sheath component: low-melting point polyethylene terephthalate (melting point: 110° C.), core component: homopolyethylene terephthalate (melting point: 255° C.), sheath rate: 50% by mass, "SAF-MET" (registered trademark) T9611 manufactured by TORAY INDUSTRIES, INC.) having an average fiber length of 51 mm and a single yarn fineness of 2.2 dtex were mixed.

(Laminate)

A laminate was obtained by the same joining method as in Example 1. The obtained laminate had a bending resistance of 230 mm, a sound absorbing rate at 1000 Hz of 73%, and a sound absorbing rate at 5000 Hz of 80%, and the comprehensive evaluation of the laminate was "A". The structure and properties of the laminate are shown in Table 1.

Comparative Example 1

(Woven Fabric Layer)

Using a 5.6 dtex/9-70 filament polyethylene terephthalate yarn (total fineness: 50 dtex) as a warp yarn and a weft yarn, a woven fabric having a finished weave density in the warp direction of 120 yarns/2.54 cm and a finished weave density in the weft direction of 130 yarns/2.54 cm, a basis weight of 50 g/m², and a thickness of 0.1 mm was obtained. Note that the woven fabric had one weave repeat of plain weave, and the percentage of the weaving yarn having a total fineness of 150 to 500 dtex based on the woven fabric in total was 0%. The evaluation results such as air permeability are shown in Table 1.

(Nonwoven Fabric Layer)

A commercially available foamed polyethylene foam having a basis weight of 20 g/m² and a thickness of 3 mm was used.

(Laminate)

The woven fabric layer and the nonwoven fabric layer were bonded together with 5 g/m² of a reaction crosslinkable polyurethane adhesive to give a laminate. The obtained laminate had a bending resistance of 175 mm, a sound absorbing rate at 1000 Hz of 75%, and a sound absorbing rate at 5000 Hz of 25%, and the comprehensive evaluation of the laminate was "C". The structure and properties of the laminate are shown in Table 2.

Comparative Example 2

(Woven Fabric Layer)

The same woven fabric as in Comparative Example 1 was used.

(Nonwoven Fabric Layer)

The same nonwoven fabric as in Example 1 was used.

(Laminate)

A laminate was obtained by the same joining method as in Example 1. The obtained laminate had a bending resistance of 170 mm, a sound absorbing rate at 1000 Hz of 51%, and a sound absorbing rate at 5000 Hz of 80%, and the comprehensive evaluation of the laminate was "C". The structure and properties of the laminate are shown in Table 2.

Comparative Example 3

(Woven Fabric Layer)
Using a 195 dtex/2-84 filament polyethylene terephthalate false twisted yarn (total fineness: 295 dtex) as a warp yarn and a 195 dtex/2-84 filament polyethylene terephthalate false twisted yarn (total fineness: 295 dtex) and a 1100 dtex-288 filament polyethylene terephthalate false twisted yarn (total fineness: 1200 dtex) as weft yarns, a woven fabric dyed in gray having a finished weave density in the warp direction of 44 yarns/2.54 cm and a finished weave density in the weft direction of 51 yarns/2.54 cm, a basis weight of 300 g/m$^2$, and a thickness of 0.9 mm was obtained. The ratio among the used yarns was 45% by mass of the 195 dtex/2-84 filament polyethylene terephthalate false twisted yarn (total fineness: 295 dtex), 19% by mass of the 195 dtex/2-84 filament polyethylene terephthalate false twisted yarn (total fineness: 295 dtex), and 36% by mass of the 1100 dtex-288 filament polyethylene terephthalate false twisted yarn (total fineness: 1200 dtex). Note that the woven fabric had one weave repeat of plain weave, and the percentage of the weaving yarn having a total fineness of 150 to 500 dtex based on the woven fabric in total was 64%. The evaluation results such as air permeability are shown in Table 1.
(Nonwoven Fabric Layer)
The same nonwoven fabric as in Example 1 was used.
(Laminate)
A laminate was obtained by the same joining method as in Example 1. The obtained laminate had a bending resistance of 240 mm, a sound absorbing rate at 1000 Hz of 54%, and a sound absorbing rate at 5000 Hz of 75%, and the comprehensive evaluation of the laminate was "C". The structure and properties of the laminate are shown in Table 2.

Comparative Example 4

Using a 56 dtex-36 filament polyethylene terephthalate false twisted yarn (total fineness: 59 dtex) as a warp yarn and a 56 dtex-36 filament polyethylene terephthalate false twisted yarn (total fineness: 59 dtex) and a 167 dtex/2-48 filament polyethylene terephthalate false twisted yarn (total fineness: 350 dtex) as weft yarns, a woven fabric dyed in gray having a finished weave density in the warp direction of 90 yarns/2.54 cm and a finished weave density in the weft direction of 120 yarns/2.54 cm, a basis weight of 110 g/m$^2$, and a thickness of 0.4 mm was obtained. The ratio between the used yarns was 75% by mass of the 56 dtex-36 filament polyethylene terephthalate false twisted yarn (total fineness: 59 dtex) and 25% by mass of the 167 dtex/2-48 filament polyethylene terephthalate false twisted yarn (total fineness: 350 dtex). Note that the woven fabric had one weave repeat of derivative plain weave structure, and the percentage of the weaving yarn having a total fineness of 150 to 500 dtex based on the woven fabric in total was 25%. The evaluation results such as air permeability are shown in Table 1.
(Nonwoven Fabric Layer)
The same nonwoven fabric as in Example 1 was used.
(Laminate)
A laminate was obtained by the same joining method as in Example 1. The obtained laminate had a bending resistance of 205 mm, a sound absorbing rate at 1000 Hz of 53%, and a sound absorbing rate at 5000 Hz of 81%, and the comprehensive evaluation of the laminate was "C". The structure and properties of the laminate are shown in Table 2.

Comparative Example 5

Using a 75 dtex-36 filament polyethylene terephthalate yarn (total fineness: 75 dtex) as a warp yarn and a weft yarn, a woven fabric dyed in gray having a finished weave density in the warp direction of 90 yarns/2.54 cm and a finished weave density in the weft direction of 120 yarns/2.54 cm, a basis weight of 90 g/m$^2$, and a thickness of 0.4 mm was obtained. Note that the woven fabric had one weave repeat of 5 harness satin weave, and the percentage of the weaving yarn having a total fineness of 150 to 500 dtex based on the woven fabric in total was 0%. The evaluation results such as air permeability are shown in Table 1.
(Nonwoven Fabric Layer)
The same nonwoven fabric as in Example 1 was used.
(Laminate)
A laminate was obtained by the same joining method as in Example 1. The obtained laminate had a bending resistance of 170 mm, a sound absorbing rate at 1000 Hz of 41%, and a sound absorbing rate at 5000 Hz of 83%, and the comprehensive evaluation of the laminate was "C". The structure and properties of the laminate are shown in Table 2.

Comparative Example 6

Using a 330 dtex-96 filament polyethylene terephthalate false twisted yarn (total fineness: 360 dtex) as a warp yarn and a weft yarn, a woven fabric dyed in gray having a finished weave density in the warp direction of 52 yarns/2.54 cm and a finished weave density in the weft direction of 98 yarns/2.54 cm, a basis weight of 450 g/m$^2$, and a thickness of 2.2 mm was obtained. Note that the woven fabric had one weave repeat of plain weave, and the percentage of the weaving yarn having a total fineness of 150 to 500 dtex based on the woven fabric in total was 100%. The evaluation results such as air permeability are shown in Table 1.
A woven fabric to which the low-melting point powder resin was bonded by the same coating method of the low-melting point powder resin as in Example 1 was obtained.
(Nonwoven Fabric Layer)
The same nonwoven fabric as in Example 1 was used.
(Laminate)
A laminate was obtained by the same joining method as in Example 1. The obtained laminate had a bending resistance of 330 mm, a sound absorbing rate at 1000 Hz of 66%, and a sound absorbing rate at 5000 Hz of 67%, and the comprehensive evaluation of the laminate was "C". The structure and properties of the laminate are shown in Table 2.

Comparative Example 7

Using a 167 dtex-48 filament polyethylene terephthalate false twisted yarn (total fineness: 175 dtex) as a warp yarn and a 167 dtex/2-48 filament polyethylene terephthalate false twisted yarn (total fineness: 350 dtex) as a weft yarn, a woven fabric dyed in gray having a finished weave density in the warp direction of 49 yarns/2.54 cm and a finished weave density in the weft direction of 252 yarns/2.54 cm, a basis weight of 250 g/m$^2$, and a thickness of 0.7 mm was obtained. The ratio between the used yarns was 68% by mass of the 167 dtex-48 filament polyethylene terephthalate false twisted yarn (total fineness: 175 dtex) and 32% by mass of the 167 dtex/2-48 filament polyethylene terephthalate false twisted yarn (total fineness: 350 dtex). Note that the woven fabric had one weave repeat of plain weave, and the percentage of the weaving yarn having a total fineness of 150 to 500 dtex based on the woven fabric in total was 100%. The evaluation results such as air permeability are shown in Table 1.

A woven fabric to which the low-melting point powder resin was bonded by the same coating method of the low-melting point powder resin as in Example 1 was obtained.

(Nonwoven Fabric Layer)

The same nonwoven fabric as in Example 1 was used.

(Laminate)

A laminate was obtained by the same joining method as in Example 1.

The obtained laminate had a bending resistance of 220 mm, a sound absorbing rate at 1000 Hz of 65%, and a sound absorbing rate at 5000 Hz of 64%, and the comprehensive evaluation of the laminate was "C". The structure and properties of the laminate are shown in Table 2.

Comparative Example 8

Using a 167 dtex-48 filament polyethylene terephthalate false twisted yarn (total fineness: 175 dtex) as a warp yarn and a weft yarn, a woven fabric dyed in gray having a finished weave density in the warp direction of 19 yarns/2.54 cm and a finished weave density in the weft direction of 81 yarns/2.54 cm, a basis weight of 150 g/m$^2$, and a thickness of 0.3 mm was obtained. Note that the woven fabric had one weave repeat of plain weave, and the percentage of the weaving yarn having a total fineness of 150 to 500 dtex based on the woven fabric in total was 100%. The evaluation results such as air permeability are shown in Table 1.

A woven fabric to which the low-melting point powder resin was bonded by the same coating method of the low-melting point powder resin as in Example 1 was obtained.

(Nonwoven Fabric Layer)

The same nonwoven fabric as in Example 1 was used.

(Laminate)

A laminate was obtained by the same joining method as in Example 1.

The obtained laminate had a bending resistance of 170 mm, a sound absorbing rate at 1000 Hz of 48%, and a sound absorbing rate at 5000 Hz of 76%, and the comprehensive evaluation of the laminate was "C". The structure and properties of the laminate are shown in Table 2.

TABLE 1

|  |  | unit | Example 1 | Example 2 | Example 3 | Example 4 |
|---|---|---|---|---|---|---|
| Woven fabric layer | Basis weight | g/m$^2$ | 220 | 160 | 220 | 180 |
|  | Thickness | mm | 0.7 | 0.5 | 0.7 | 0.5 |
|  | Constituent fiber | — | 350 dtex: 67% by mass 340 dtex: 33% by mass | 175 dtex: 49% by mass 350 dtex: 51% by mass | 59 dtex: 58% by mass 174 dtex: 28% by mass 350 dtex: 14% by mass | 350 dtex: 59% by mass 360 dtex: 41% by mass |
|  | Content of fiber having total fineness of 150 to 500 dtex in woven fabric in total | % by mass | 100 | 100 | 42 | 100 |
|  | Weave density in warp direction | number of yarns/2.54 cm | 49 | 53 | 83 | 59 |
|  | Weave density in weft direction | number of yarns/2.54 cm | 90 | 98 | 342 | 89 |
|  | Rate of weave density difference[1] | — | 0.8 | 0.8 | 3.1 | 0.5 |
|  | Number of types of weave repeats | — | 2 | 2 | 2 | 1 |
|  | Air permeability | cm$^3$/cm$^2$/s | 26 | 30 | 18 | 34 |
|  | Pore size dispersity 0 to 10 μm | % | 24 | 23 | 27 | 23 |
|  | 10 to 20 μm | % | 34 | 32 | 23 | 19 |
|  | 20 to 30 μm | % | 32 | 25 | 25 | 14 |
| Nonwoven fabric layer | Form | — | Nonwoven fabric | Nonwoven fabric | Nonwoven fabric | Nonwoven fabric |
|  | Basis weight | g/m$^2$ | 400 | 400 | 400 | 400 |
|  | Thickness | mm | 20 | 20 | 20 | 20 |
|  | Binder fiber | % by mass | 15 | 15 | 15 | 15 |
| Laminate | Bending resistance | mm | 210 | 180 | 190 | 200 |
|  | Sound absorbing rate at 1000 Hz | % | 75 | 71 | 81 | 64 |
|  | Sound absorbing rate at 5000 Hz | % | 90 | 88 | 76 | 80 |
|  | Comprehensive evaluation | — | A | A | A | A |

|  |  | unit | Example 5 | Example 6 | Example 7 | Example 8 |
|---|---|---|---|---|---|---|
| Woven fabric layer | Basis weight | g/m$^2$ | 130 | 220 | 220 | 220 |
|  | Thickness | mm | 0.3 | 0.7 | 0.7 | 0.7 |
|  | Constituent fiber | — | 175 dtex: 100% by mass | 350 dtex: 67% by mass 340 dtex: 33% by mass | 350 dtex: 67% by mass 340 dtex: 33% by mass | 350 dtex: 67% by mass 340 dtex: 33% by mass |

TABLE 1-continued

|  |  | Unit |  |  |  |  |
|---|---|---|---|---|---|---|
|  | Content of fiber having total fineness of 150 to 500 dtex in woven fabric in total | % by mass | 100 | 100 | 100 | 100 |
|  | Weave density in warp direction | number of yarns/2.54 cm | 49 | 49 | 49 | 49 |
|  | Weave density in weft direction | number of yarns/2.54 cm | 90 | 90 | 90 | 90 |
|  | Rate of weave density difference[1] | — | 0.8 | 0.8 | 0.8 | 0.8 |
|  | Number of types of weave repeats | — | 2 | 2 | 2 | 2 |
|  | Air permeability | cm³/cm²/s | 36 | 26 | 26 | 26 |
|  | Pore size dispersity 0 to 10 μm | % | 5 | 24 | 24 | 24 |
|  | 10 to 20 μm | % | 30 | 34 | 34 | 34 |
|  | 20 to 30 μm | % | 35 | 32 | 32 | 32 |
| Nonwoven fabric layer | Form | — | Nonwoven fabric | Nonwoven fabric | Nonwoven fabric | Nonwoven fabric |
|  | Basis weight | g/m² | 400 | 400 | 400 | 400 |
|  | Thickness | mm | 20 | 20 | 20 | 20 |
|  | Binder fiber | % by mass | 15 | 35 | 15 | 15 |
| Laminate | Bending resistance | mm | 190 | 340 | 280 | 230 |
|  | Sound absorbing rate at 1000 Hz | % | 63 | 72 | 70 | 73 |
|  | Sound absorbing rate at 5000 Hz | % | 78 | 87 | 75 | 80 |
|  | Comprehensive evaluation | — | A | B | A | A |

[1] Rate of weave density difference: value obtained by dividing difference between weave density in warp direction and weave density in weft direction by smaller one of weave density in warp direction and weave density in weft direction

TABLE 2

|  |  | Unit | Comparative Example 1 | Comparative Example 2 | Comparative Example 3 | Comparative Example 4 |
|---|---|---|---|---|---|---|
| Woven fabric layer | Basis weight | g/m² | 50 | 50 | 300 | 110 |
|  | Thickness | mm | 0.1 | 0.1 | 0.9 | 0.4 |
|  | Constituent fiber | — | 50 dtex: 100% by mass | 50 dtex: 100% by mass | 295 dtex: 64% by mass 1200 dtex: 36% by mass | 59 dtex: 75% by mass 350 dtex: 25% by mass |
|  | Content of fiber having total fineness of 150 to 500 dtex in woven fabric in total | % by mass | 0 | 0 | 64 | 25 |
|  | Weave density in warp direction | number of yarns/2.54 cm | 120 | 120 | 44 | 90 |
|  | Weave density in weft direction | number of yarns/2.54 cm | 130 | 130 | 51 | 120 |
|  | Rate of weave density difference[1] | — | 0.1 | 0.1 | 0.2 | 0.3 |
|  | Number of types of weave repeats | — | 1 | 1 | 1 | 1 |
|  | Air permeability | cm³/cm²/s | 11 | 11 | 35 | 21 |
|  | Pore size dispersity 0 to 10 μm | % | 56 | 56 | 19 | 0 |
|  | 10 to 20 μm | % | 40 | 40 | 14 | 6 |
|  | 20 to 30 μm | % | 4 | 4 | 10 | 13 |
| Nonwoven fabric layer | Form | — | Foam | Nonwoven fabric | Nonwoven fabric | Nonwoven fabric |
|  | Basis weight | g/m² | 20 | 400 | 400 | 400 |
|  | Thickness | mm | 3 | 20 | 20 | 20 |
|  | Binder fiber | % by mass | 0 | 15 | 15 | 15 |
| Laminate | Bending resistance | mm | 175 | 170 | 240 | 205 |
|  | Sound absorbing rate at 1000 Hz | % | 75 | 51 | 54 | 53 |
|  | Sound absorbing rate at 5000 Hz | % | 25 | 80 | 75 | 81 |
|  | Comprehensive evaluation | — | C | C | C | C |

|  |  | unit | Comparative Example 5 | Comparative Example 6 | Comparative Example 7 | Comparative Example 8 |
|---|---|---|---|---|---|---|
| Woven fabric layer | Basis weight | g/m² | 90 | 450 | 250 | 150 |
|  | Thickness | mm | 0.4 | 2.2 | 0.7 | 0.3 |
|  | Constituent fiber | — | 75 dtex: 100% by mass | 360 dtex: 100% by mass | 175 dtex: 68% by mass 350 dtex: 32% by mass | 175 dtex: 100% by mass |
|  | Content or fiber naving total fineness of 150 to 500 dtex in woven fabric in total | % by mass | 0 | 100 | 100 | 100 |
|  | Weave density in warp direction | number of yarns/2.54 cm | 90 | 52 | 49 | 19 |

TABLE 2-continued

| | | | | | | |
|---|---|---|---|---|---|---|
| | Weave density in weft direction | number of yarns/2.54 cm | 120 | 98 | 252 | 81 |
| | Rate of weave density difference[1] | — | 0.3 | 0.9 | 4.1 | 3.3 |
| | Number of types of weave repeats | — | 1 | 1 | 1 | 1 |
| | Air permeability | cm³/cm²/s | 61 | 16 | 15 | 45 |
| | Pore size dispersity  0 to 10 μm | % | 0 | 53 | 2 | 4 |
| | 10 to 20 μm | % | 18 | 22 | 15 | 21 |
| | 20 to 30 μm | % | 25 | 15 | 35 | 8 |
| Nonwoven fabric layer | Form | — | Nonwoven fabric | Nonwoven fabric | Nonwoven fabric | Nonwoven fabric |
| | Basis weight | g/m² | 400 | 400 | 400 | 400 |
| | Thickness | mm | 20 | 20 | 20 | 20 |
| | Binder fiber | % by mass | 15 | 15 | 15 | 15 |
| Laminate | Bending resistance | mm | 170 | 330 | 220 | 170 |
| | Sound absorbing rate at 1000 Hz | % | 41 | 66 | 65 | 48 |
| | Sound absorbing rate at 5000 Hz | % | 83 | 67 | 64 | 76 |
| | Comprehensive evaluation | — | C | C | C | C |

[1] Rate of weave density difference: value obtained by dividing difference between weave density in warp direction and weave density in weft direction by smaller one of weave density in warp direction and weave density in weft direction

The invention claimed is:

1. A laminate comprising a woven fabric layer and a nonwoven fabric layer,
wherein:
the woven fabric layer contains a fiber having a total fineness of 150 to 500 dtex in an amount of 40% by mass or more based on the woven fabric layer in total,
a value obtained by dividing a difference between a weave density in a warp direction of the woven fabric layer and a weave density in a weft direction of the woven fabric layer by a smaller one of the weave density in the warp direction of the woven fabric layer and the weave density in the weft direction of the woven fabric layer is 0.5 to 3.5,
the woven fabric layer has a basis weight of 100 to 400 g/m², a thickness of 0.3 to 2.0 mm, and an air permeability of 15 to 40 cm³/cm²/s, and
the nonwoven fabric layer has a basis weight of 200 to 500 g/m² and a thickness of 5 to 40 mm.

2. The laminate according to claim 1, wherein the woven fabric layer includes two or more different weave repeats in a surface of the woven fabric layer opposite to a surface of the woven fabric layer on a nonwoven fabric layer side.

3. The laminate according to claim 1, wherein fine pores are present on a surface of the woven fabric layer, where the pores have a pore size dispersity of 10 to 30 in a fine pore size distribution range of 0 to 10 μm, and a pore size dispersity of 20 to 50 in a fine pore size distribution range of 10 to 20 μm, where pore size dispersity is measured according to ASTM F316-86.

4. The laminate according to claim 1, having a bending resistance of 300 mm or less as measured according to Method A of NS L1096 (8.19.1).

5. The laminate according to claim 1, wherein the nonwoven fabric layer contains a thermoplastic binder fiber, and has a content of the thermoplastic binder fiber of 10 to 30% by mass based on the nonwoven fabric layer in total.

* * * * *

UNITED STATES PATENT AND TRADEMARK OFFICE
CERTIFICATE OF CORRECTION

PATENT NO. : 10,854,185 B2
APPLICATION NO. : 16/084404
DATED : December 1, 2020
INVENTOR(S) : Kenichi Sakai It is certified that error appears in the above-identified patent and that said Letters Patent is hereby corrected as shown below:

In the Claims

Claim 4 is shown as:
The laminate according to claim 1, having a bending resistance of 300 mm or less as measured according to Method A of NS L1096 (8.19.1).
Should read as:
The laminate according to claim 1, having a bending resistance of 300 mm or less as measured according to Method A of JIS L1096 (8.19.1).

Signed and Sealed this
Twenty-sixth Day of January, 2021

Drew Hirshfeld
*Performing the Functions and Duties of the*
*Under Secretary of Commerce for Intellectual Property and*
*Director of the United States Patent and Trademark Office*